July 1, 1930.　　　　　F. J. PRATT　　　　　1,768,931
DIAL INDICATOR
Filed June 3, 1929　　　3 Sheets-Sheet 3
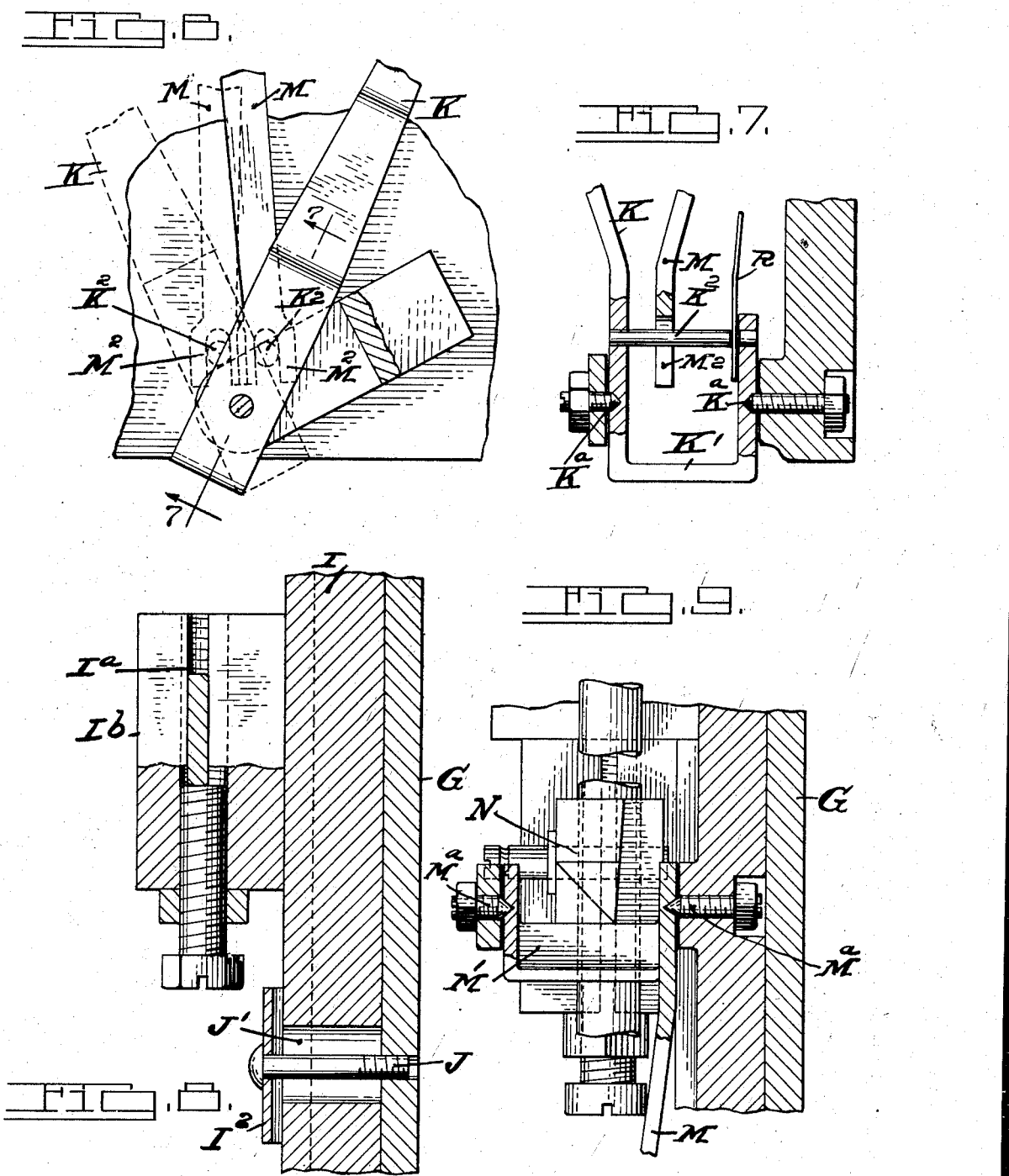
Inventor
Frederick Jackson Pratt
by S. E. Thomas
Atty.

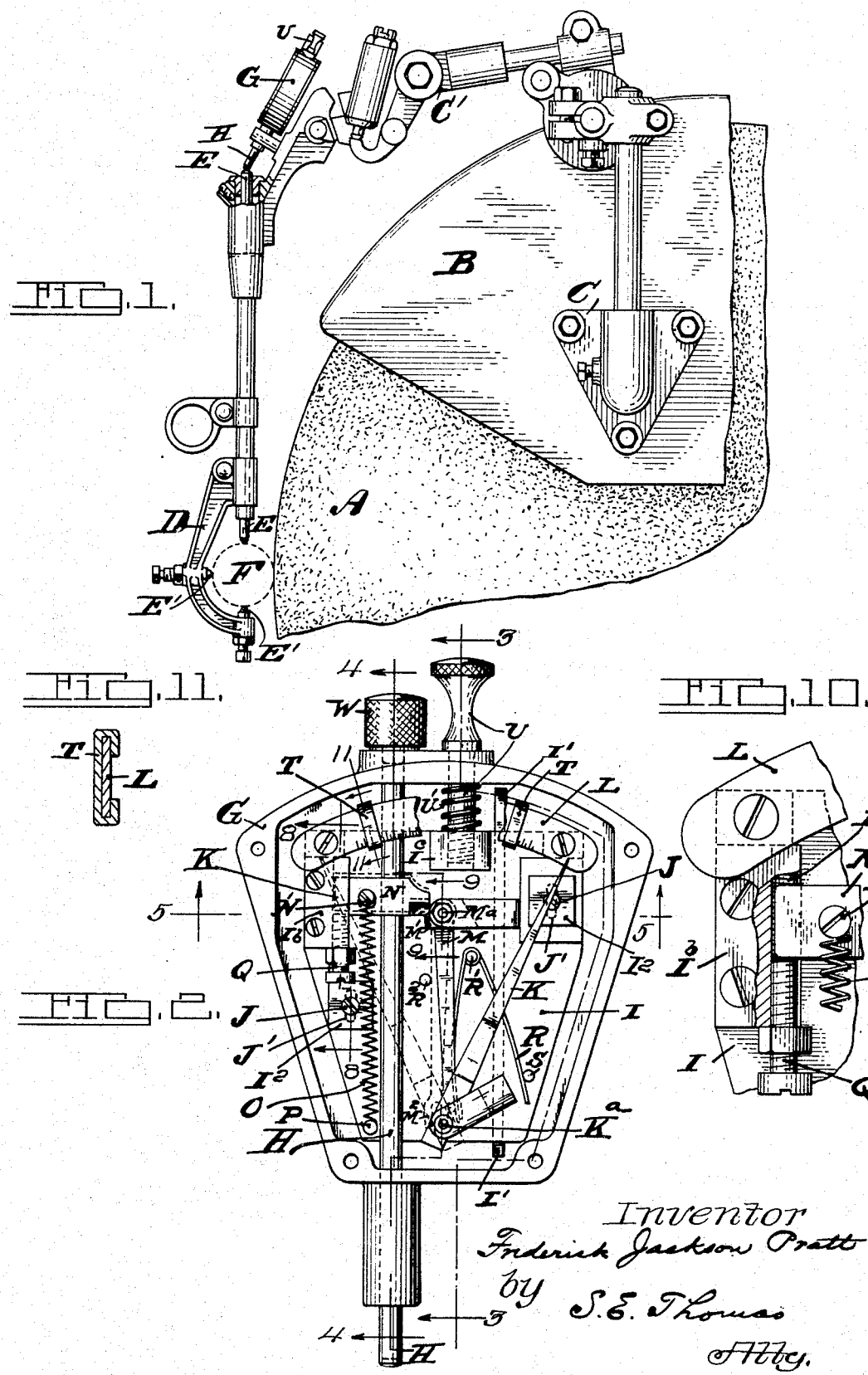

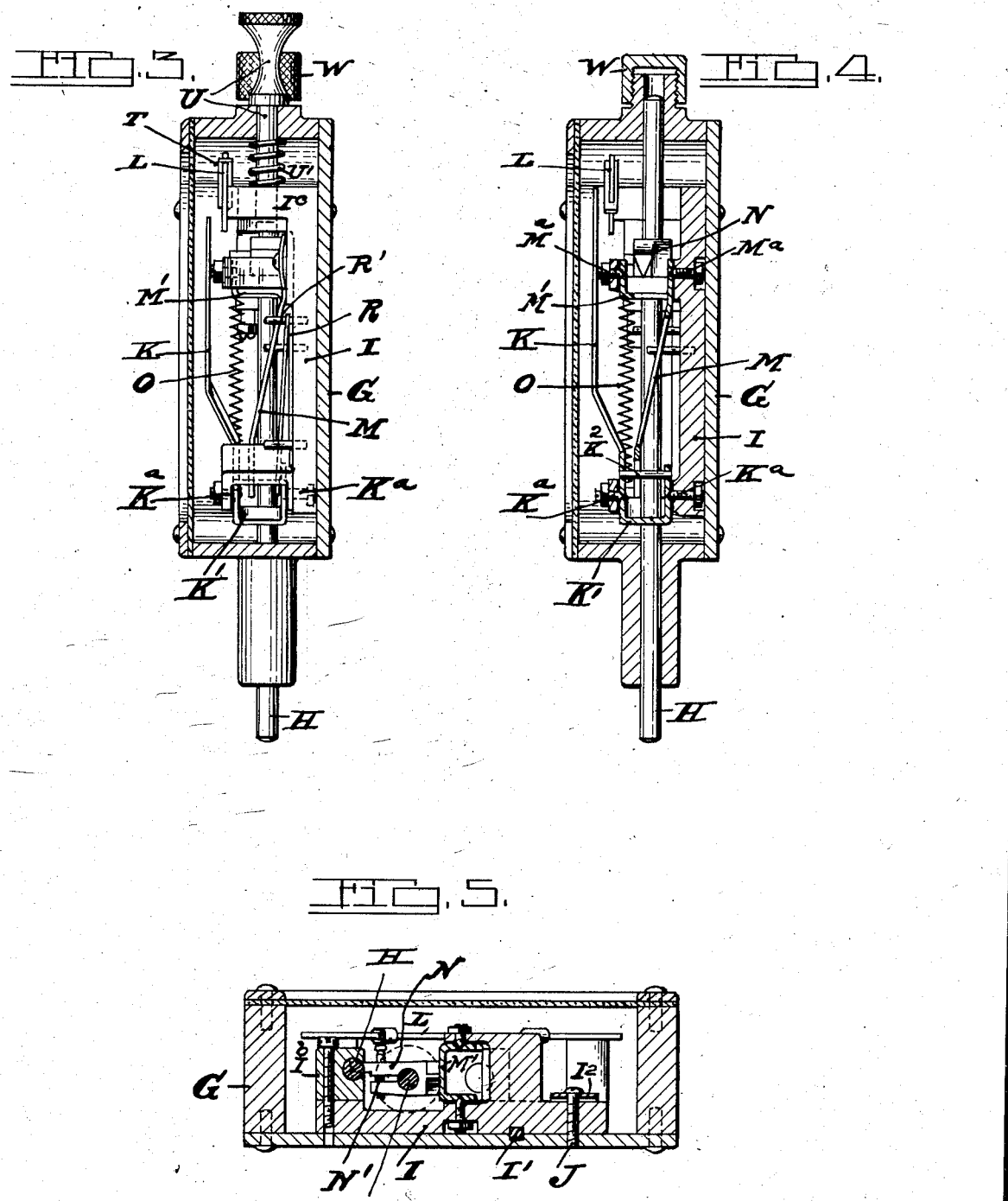

Patented July 1, 1930

1,768,931

UNITED STATES PATENT OFFICE

FREDERICK JACKSON PRATT, OF FERNDALE, MICHIGAN

DIAL INDICATOR

Application filed June 3, 1929. Serial No. 367,864.

My invention relates to a device for indicating comparative differences between an original or master element and reproductions of said element.

Micrometers or dial indicators for example have been employed on grinding machines to automatically disclose the instant diameter of the work element while the machine is engaged in grinding the element to a predetermined size, or to correspond with that of a master element.

Dial indicators embodying a train of gears adapted to swing a pointer over a graduated segment have previously been used for this purpose, but it is well known that the teeth of the gears soon become worn and as a result the device forthwith becomes inaccurate.

Especially is this true when the gauge is used continuously for a long period of time on work of a like range. The gear teeth brought into use within the range obviously wear to a greater extent than the gear teeth not used;—therefore should the indicator be subsequently employed on work of greater range, inaccuracies of measurement will be noted, due to variations caused by the worn teeth meshing with those not worn.

It is therefore one of the objects of this invention to provide a device in which all gears and parts likely to become worn unduly through use have been eliminated.

A further object of the invention is to provide all swinging parts with pivot bearings, adjustable for overcoming play, that greater accuracy may be obtained.

A further object of the invention is to provide for a vertical adjustment of the plate on which the several moving parts of the gauge mechanism are mounted, in order that the swinging pointer may orientate in relation to an arbitrary starting point or "zero" graduation when the stylus is brought into contact with the master work element,—before being replaced by the work to be tested to accord with said master element.

A further object of the invention is to provide manually adjustable means mounted upon a graduated segment, in spaced relation to each other,—spaced an equidistance from each side of the zero graduation,—to indicate what in shop practice is known as "tolerance" or the maximum variation from exact size permitted to pass inspection.

Suitable means are provided to properly mount the device in relation to a testing apparatus, as for example a grinding machine and the article being ground, that it may be maintained in the same relation to the article being ground throughout the entire grinding period.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a fragmentary diagrammatical side elevation of a grinding machine showing the dial indicator mounted in a suitable supporting frame, coordinating with a stylus mounted in said frame.

Figure 2 is a front elevation of the indicator with the cover plate removed and a portion of the graduated segment broken away to disclose parts located at the rear of said segment.

Figure 3 is a vertical cross-sectional view taken on or about line 3—3 of Figure 2 as viewed from the direction indicated by the arrows.

Figure 4 is a vertical cross-sectional view taken on or about line 4—4 of Figure 2, as viewed from the direction indicated by the arrows.

Figure 5 is a horizontal cross-sectional view taken on or about line 5—5 of Figure 2, as viewed from the direction indicated by the arrows.

Figure 6 is a fragmentary elevation with parts in section, showing the swinging pointer and the yoke-shaped lower end of the arm controlling the oscillation of the pointer.

Figure 7 is a fragmentary cross-sectional view taken on or about line 7—7 of Figure 6, showing the pivot bearings for the swinging pointer, and in section a fragment of the yoke-shaped end of the controlling arm.

Figure 8 is a fragmentary vertical cross-sectional view taken on or about line 8—8 of Figure 2 showing the adjustable screw for limiting the downward movement of the rod which in turn cooperates with the stylus applied to the work.

Figure 9 is a fragmentary cross-sectional view taken on or about line 9—9 of Figure 2 showing the pivot bearings of the arm controlling the oscillation of the pointer, also the end of a divided knife-edge block adjustably secured to the rod cooperating with the stylus of the gauge.

Figure 10 is a fragmentary elevation with parts broken away showing the vertically adjustable screw serving as an abutment for limiting the downward thrust of the spring actuated rod, cooperating with the stylus of the gauge.

Figure 11 is a detail view in cross-section taken on or about line 11—11 of Figure 2, showing one of a pair of manually adjustable clips, mounted on the graduated segment to indicate the maximum "tolerance" allowed in either direction from zero.

Referring now to the letters of reference placed upon the drawings:

A denotes the grinding wheel of a grinding machine—not shown—fitted with the usual shield or guard B to which is bolted a bracket C for supporting a swinging frame arm $C^1$, from which is suspended a grinding gauge D, fitted with a movable stylus E, adapted to contact with the work F to be ground. $E^1$, $E^1$ are diamond fitted contact screws adapted to remain in fixed position when properly adjusted to the work.

G denotes the inclosing case of the dial indicator mechanism,—in the upper and lower walls of which is mounted a movable rod H, bearing at its lower end upon the movable stylus E.

Within the housing is a vertically slidable mechanism-supporting plate I, guided by a key $I^1$ projecting from the rear wall of the housing into a groove formed in the plate to receive it.

J, J denote bolts screwed into the rear wall of the housing extending through slots $J^2$ in the slidable mechanism-supporting plate,— the heads of the bolts overlapping spring washers $I^2$ serving to hold the plate in yielding, slidable contact with the rear wall of the housing.

K denotes a swinging pointer adapted to traverse a graduated segment L, secured to a pair of studs projecting outwardly from and integral with the slidable plate.

The pointer K at its pivotal end is secured to a U-shaped member $K^1$—see Figure 7— having aligned cone-shaped recesses to receive the pivot bearings $K^a$, $K^a$ mounted in an L-shaped bracket projecting from and integral with the slidable plate I.

M denotes a swinging arm secured at its upper pivotal end to a U-shaped member $M^1$— see Figure 9—recessed to receive pivot bearings $M^a$, $M^a$ mounted in an L-shaped bracket integral with the slidable mechanism-supporting plate I. The lower end of the swinging arm is forked at $M^2$ to straddle a stub-shaft $K^2$, bridging the space between the walls of the U-shaped member $K^1$ carrying the swinging pointer.

N is a partially divided block secured to the movable rod H by a clamping bolt $N^1$ adapted when adjusted to grip the block upon the rod. The divided block N has a knife-edge formation at one end overlapping the U-shaped member $M^1$ of the swinging arm M;—while its opposite relatively narrow projecting end slides in a recess $I^a$ formed in a lug $I^b$, projecting from the slidable plate I— see Figures 5, 8 and 10.

O denotes a spring adapted to shift the pointer K to the limit of its movement in one direction and is engaged at one end to the clamping bolt $N^1$ and at the other to a pin P projecting from the plate I.

Q indicates a screw-bolt in the lug $I^b$ forming an adjustable stop whereby the downward movement of the block N may be regulated—see Figure 8.

R denotes a relatively weak spring—adapted to shift the pointer K to the limit of its movement in the opposite direction from that taken when actuated by the spring O— mounted medially upon a post $R^1$ projecting from the slidable mechanism-supporting plate I, with one portion of the spring acting upon the swinging arm M and the other portion bearing against a post S projecting from the slidable mechanism-supporting plate I— see Figure 2. $R^2$ denotes a post to limit the swinging movement of the arm in one direction—see Figure 2.

Manually slidable upon the graduated segment are two slidable clips T, T adapted to be equally spaced from the zero graduation to indicate the maximum tolerance allowed on work passing inspection.

U denotes an adjustable screw-bolt extending through the wall of the housing into a lug $I^c$. $U^1$ is a spring coiled around the screw-bolt bearing at one end against the wall of the housing and at the other against the lug $I^c$ integral with the vertically slidable mechanism-supporting plate I.

By adjusting the screw U, the vertically movable plate I supporting the several movable parts may be raised or lowered, that the movable pointer may be adjusted to 'zero' when applying the grinding gauge to a master work element prior to the introduction of the actual work element to the grinding wheel before grinding the latter to correspond with the master work element.

W denotes a closure cap screwed upon a neck projecting from the wall of the case through which the movable rod H may be inserted when assembling the parts.

Having indicated the several parts by reference letters, the construction and operation of the device will be readily understood.

The dial-indicator is secured in a suitable supporting frame,—attached to a grinding machine. The grinding gauge is also mounted in the supporting frame with the stylus of the grinding gauge coordinating with the movable rod H, of the dial indicator—diagrammatically shown in Figure 1,—in which the 'work' is indicated in dotted lines, properly positioned in relation to the gauge and the grinding wheel.

The master work element is first inserted, the screw U is then adjusted to raise or lower the movable plate, that the swinging pointer K may be brought to zero upon the graduated segment. The clips T, T are then manually pushed along the graduated segment to points respectively equi-distant from the zero graduation,—the distance between the clips representing the maximum "tolerance" allowed for passing inspection.

The operator now starts the grinding machine, and when the grinding operation results in the pointer reaching zero, or some point between the clips T, T, the work may be removed from the grinding machine—finished for inspection.

Having thus described my invention, what I claim is:

1. In a device of the character described, a housing; a vertically slidable mechanism-supporting plate located within the housing; a swinging pointer pivoted to the slidable plate; a graduated segment coordinating with the swinging pointer, over which the pointer oscillates; a movable stylus rod journaled in the walls of the housing; a spring adapted to force the rod outwardly from the wall of the housing into contact with the element to be tested; means secured to the rod for actuating the swinging pointer and movable with the rod under the urge of said spring, whereby the instant condition of the element tested in relation to a master element may be determined; means adapted to return the pointer to its initial position, upon the stylus rod being forced in an opposite direction through contact with the element being tested; and means for raising or lowering the slidable plate upon applying the stylus to a master element, whereby the swinging pointer actuated by the vertical movement of the plate may be brought to "zero", for making other comparative measurements.

2. In a device of the character described, a housing; a vertically slidable mechanism-supporting plate located within the housing; a swinging pointer pivoted to the slidable plate; a graduated segment coordinating with the swinging pointer, over which the pointer oscillates; a movable stylus rod slidable in the walls of the housing; a spring adapted to force the rod outwardly into contact with the element to be tested; means secured to the rod for actuating the swinging pointer and movable with the rod under the urge of said spring, whereby the instant condition of the element tested in relation to a master element may be determined; adjustable means for limiting the movement of the stylus rod; a spring adapted to return the pointer to its initial position, upon the stylus rod being forced in an opposite direction through contact with the element being tested; and means for raising or lowering the slidable plate upon applying the stylus to a master element, whereby the swinging pointer actuated by the vertical movement of the plate may be brought to "zero", for making other comparative measurements.

3. A structure as specified in claim 1 in combination with a plurality of bolts, extending through slots provided in the vertically slidable mechanism-supporting plate, into the wall of the housing; and spring washers underlying the heads of said bolts, whereby the plate is forced into yieldable slidable contact with the rear wall of the housing.

4. In a device of the character described, a housing; a vertically slidable mechanism-supporting plate located within the housing and having a key-way; a key projecting from the wall of the housing into said key-way to guide the slidable plate; a manually adjustable bolt projecting through the wall of the housing into a lug extending from the slidable plate, whereby said plate may be raised or lowered; a spring sleeved on said bolt, bearing at one end upon the lug and at the other end against the wall of the housing for forcing said plate downwardly upon a releasing adjustment of said bolt; a swinging pointer pivoted to the slidable plate; a swinging arm adapted to rock the pointer; a graduated segment coordinating with the swinging pointer over which the pointer oscillates; a pair of manually movable clips slidable upon said graduated segment to indicate maximum tolerance allowed from exact duplication of a master element; a spring actuated stylus rod slidable in the wall of the housing; means adjustably secured to the stylus rod adapted to actuate the swinging arm; and means for returning the swinging pointer to its initial position.

5. In a device of the character described, a housing; a vertically slidable mechanism-supporting plate within the housing; a graduated segment; a swinging pointer having a U-shaped pivotal end; pivot-bearings extending into the opposing walls of the U-shaped pivotal end of the pointer, a bracket for supporting the pointer projecting from the slidable plate; a stub shaft bridging the U-shaped walls of the swinging pointer adjacent the latter's pivot bearings; a swinging arm forked at one end to straddle the stub shaft of the swinging pointer, with a U-shaped bearing at its opposite end; pivot bearings extending into the walls of the U-shaped end of the swinging arm, a second bracket projecting from the slidable plate for supporting the swinging arm; a movable stylus rod slidable in the walls of the housing; an arm adjustably secured to the stylus rod having a knife edge formation at one end adapted to bear upon the U-shaped portion of the swinging arm, whereby the pointer is rocked; a lug extending from the slidable plate, having a slotted recess to receive the other end of said arm; adjustable means mounted in said lug for limiting the travel of said arm; a spring adapted to actuate the stylus rod and thereby the rocking arm to tilt the pointer in one direction; and a spring for returning the pointer to its initial position.

In testimony whereof, I sign this specification.

FREDERICK JACKSON PRATT.